(12) United States Patent
Yu

(10) Patent No.: US 7,301,443 B2
(45) Date of Patent: *Nov. 27, 2007

(54) AUTOMOBILE STEERING LOCK WITH AN ALARM UNIT

(75) Inventor: Chien-Ho Yu, Tainan Hsien (TW)

(73) Assignee: Jin Shan Die Casting Industrial Co., Ltd., Yung Kang, Tainan Hsien (TW)

(*) Notice: Subject to any disclaimer, the term of this patent is extended or adjusted under 35 U.S.C. 154(b) by 183 days.

This patent is subject to a terminal disclaimer.

(21) Appl. No.: 11/110,665

(22) Filed: Apr. 21, 2005

(65) Prior Publication Data

US 2006/0226978 A1    Oct. 12, 2006

(51) Int. Cl.
 *B60R 25/10* (2006.01)
(52) U.S. Cl. .................. 340/426.31; 70/226; 70/252; 70/432
(58) Field of Classification Search ........... 340/426.31; 70/226, 252, 432
See application file for complete search history.

(56) References Cited

U.S. PATENT DOCUMENTS

| | | | | | |
|---|---|---|---|---|---|
| 5,128,649 | A | * | 7/1992 | Elmer ................... | 340/426.31 |
| 5,163,309 | A | * | 11/1992 | Wu ............................. | 70/209 |
| 5,398,017 | A | * | 3/1995 | Chen ..................... | 340/426.31 |
| 5,469,135 | A | * | 11/1995 | Solow ................... | 340/426.31 |
| 5,598,725 | A | * | 2/1997 | Chang ......................... | 70/209 |
| 5,609,050 | A | * | 3/1997 | Yu ............................... | 70/209 |
| 5,676,000 | A | * | 10/1997 | Chen ............................ | 70/209 |
| 5,678,434 | A | * | 10/1997 | Kuo et al. .................... | 70/209 |
| 5,755,124 | A | * | 5/1998 | Chang ......................... | 70/209 |
| 6,199,415 | B1 | * | 3/2001 | Markegard et al. .......... | 70/209 |
| 6,349,580 | B1 | * | 2/2002 | Kuo ............................. | 70/209 |
| 6,550,297 | B1 | * | 4/2003 | Chen ........................... | 70/209 |
| 2004/0099025 | A1 | * | 5/2004 | Wang .......................... | 70/209 |

* cited by examiner

Primary Examiner—Benjamin C. Lee

(57) ABSTRACT

An anti-theft automobile steering wheel lock with an alarm unit includes a stationary base, an insert pin, a helical spring, a locking core, a movable constrict base, an alarm unit and a cover. The locking core can be rotated with a key to let a projecting member move downwards to separate from a fitting hole so that the helical spring extends to push up both the insert pin and the locking core outwards. Meanwhile, the separation of the insert pin away from an insert hole of the telescoping rod enables the movable constrict base moved farther away from the stationary base, unlocking the lock. Reversely, pushing the locking core inwards into the stationary base can lock the lock on the steering wheel, and simultaneously the alarm unit started.

4 Claims, 6 Drawing Sheets

AUTOMOBILE STEERING LOCK WITH AN ALARM UNIT

BACKGROUND OF THE INVENTION

1. Field of the Invention

This invention relates to an anti-theft automobile steering wheel lock with an alarm unit, particularly one that includes a stationary base, an insert pin, a helical spring, a locking core, a movable constrict base, an alarm unit and a cover. The locking core can be rotated with a key to make a projecting member move downwards to separate from a fitting hole so that the helical spring compressed so far extends to push up both the insert pin and the locking core outwards. Meanwhile, the separation of the insert pin away from the insert hole of the telescoping rod enables the movable constrict base to be moved farther away from the stationary base. Thus this lock is unlocked from the steering wheel of an automobile. Reversely, pressing the locking core inwards into the lock chamber until the projecting member fits in the fitting hollow in the lock chamber and the insert pin goes into the insert hole of the telescoping rod to keep the movable constrict base positioned immovable and pressing the switch on for actuating an alarm unit. Then this lock is locked on the steering wheel. Such an invention really obtains the best performance of anti-theft and alarming.

2. Description of the Prior Art

Common conventional automobile steering locks, as shown in FIG. 1, include a body member 1 which has a hook 10 extending down, a locking core 11 fixed on the upper surface of a front portion, a grip 12 formed in an rear end, and an open end 13 formed in the front end. An elongated rod member 14 extends in the open end 13, possessing a hook 15 at its front end and a plurality of locking grooves 16 near the hook 15, forming the conventional automobile steering wheel lock.

When the conventional lock is to be used, let it rest on the steering wheel, and keep the hook 10 to fit in the inner edge of a section of the steering wheel and, then, extend outwards said elongate rod member 14 to let its hook 15 fit around the opposite inner edge of the section of the steering wheel. Under such position, the steering wheel couldn't be turned around because the extended grip would be stopped somewhere between the driver seat and the steering wheel. But, if the elongated rod member 14 and the body member 1 are simultaneously hammered illegally with force in opposite directions, the locking pin in said locking means 11 may rebound off or break down to lose the effect of locking. So this invention has been studied and improved again and again to overcome the defects in the prior art described above.

SUMMARY OF THE INVENTION

The prime object of this invention is to offer an easy and effective automobile steering wheel lock with an alarm unit.

The main characteristics of the invention are a stationary base and a movable constrict base combined together. The stationary base has a grip formed in a rear portion, a slot formed lengthwise in a front portion, a semi-circular fitting member under the front end, a locking housing extending from a side of the stationary base and having a hole connecting with the slot, and an alarm chamber formed in the hollow interior. Further, an insert pin is located in the lock chamber, with a helical spring placed on the insert pin in the lock chamber, and a locking core is also located in the lock chamber and having a rotary member in its center portion. The movable constrict base is located in front of the stationary base and having a semi-circular fitting member to face to the semi-circular fitting member of the stationary base, and an elongated telescoping rod formed in a rear portion and bored with an insert hole in the outer end. Further, an alarm unit located is located in the alarm chamber, and a cover closing on bottom of the alarm chamber 28 and having a plurality of sound holes on it.

DETAILED DESCRIPTION OF THE PREFERRED EMBODIMENT

Figure 1:
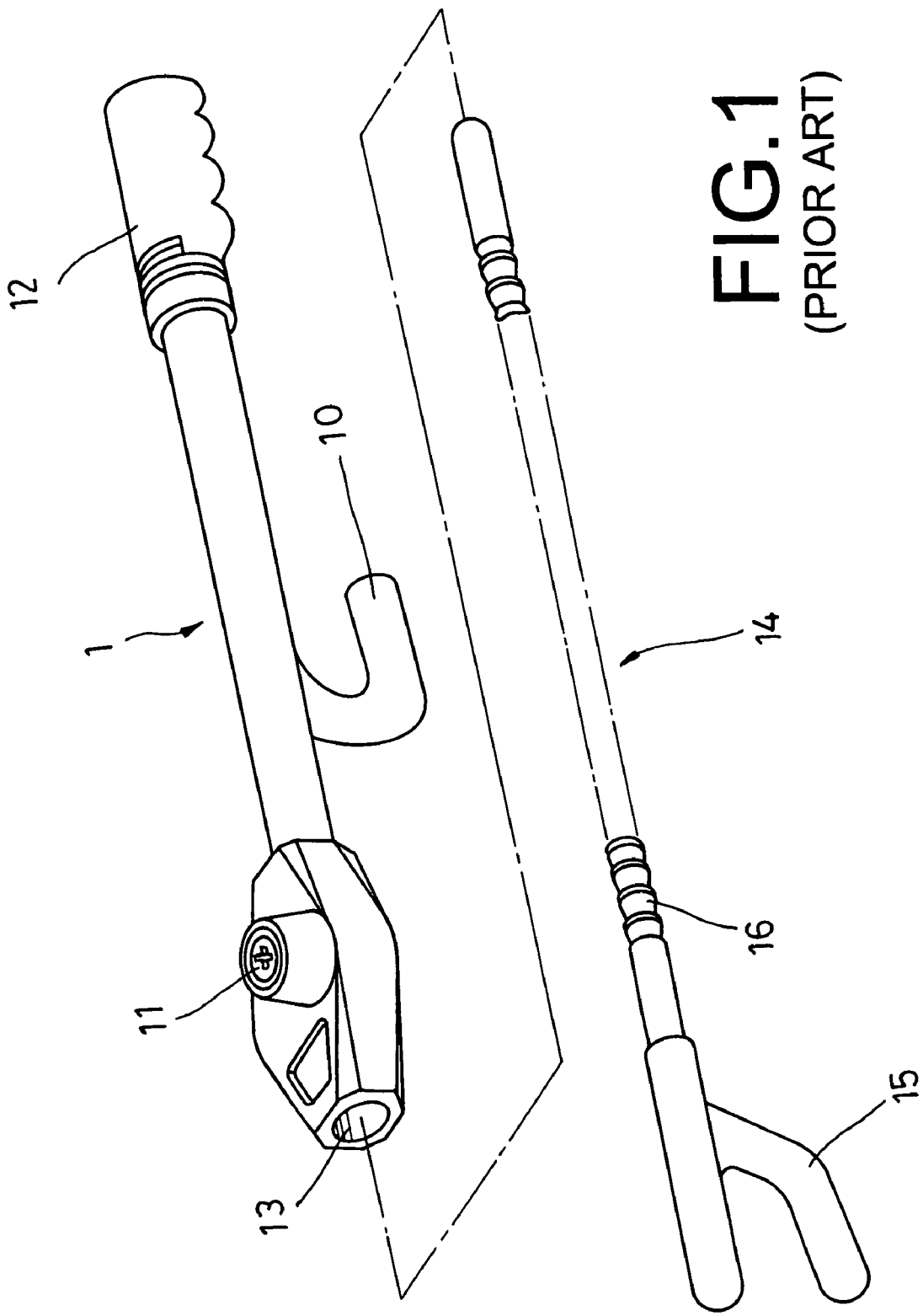
FIG. 1 is a perspective view of a conventional steering wheel lock.
Figure 2:
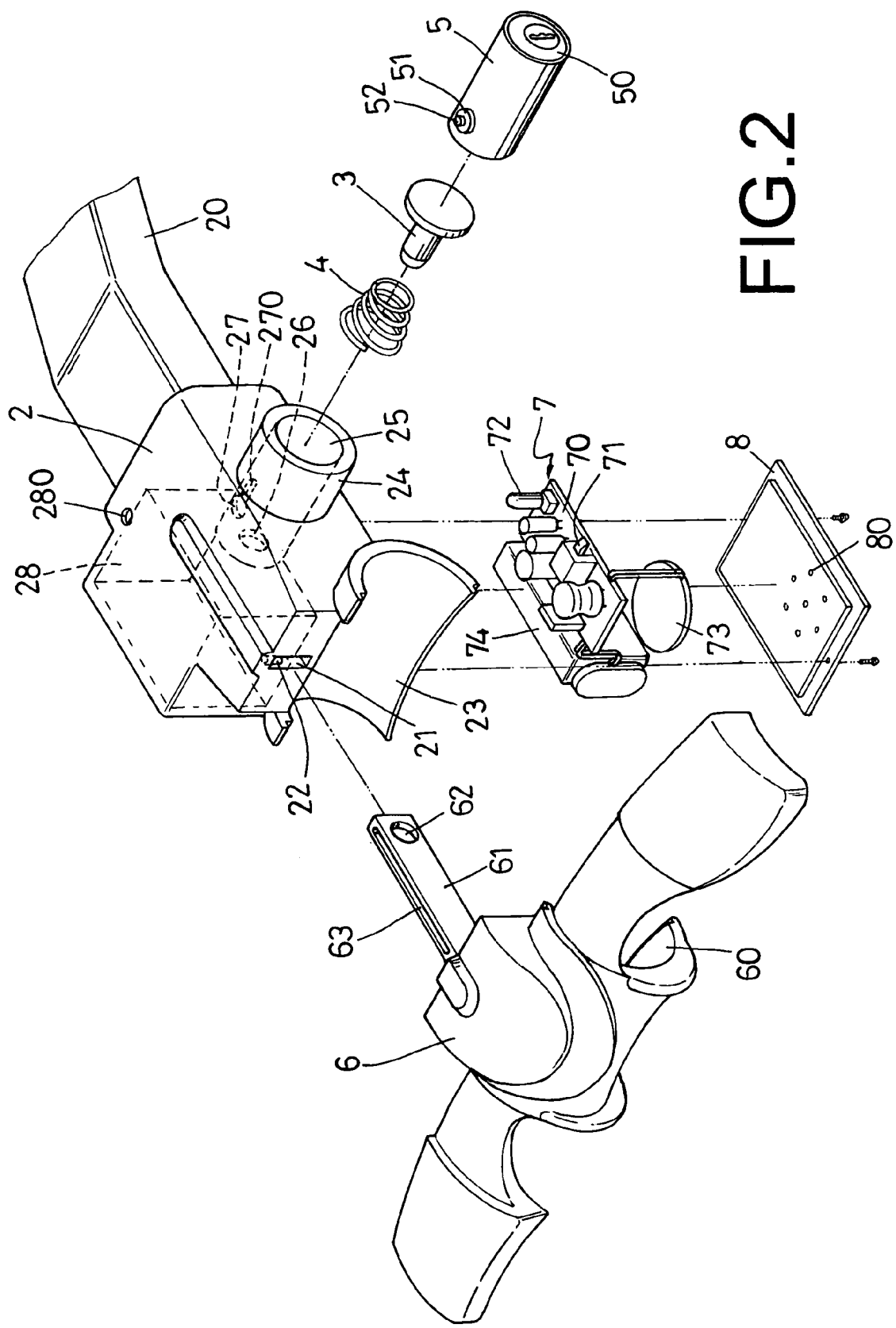
FIG. 2 is an exploded perspective view of an automobile steering wheel lock in the present invention.
Figure 3:
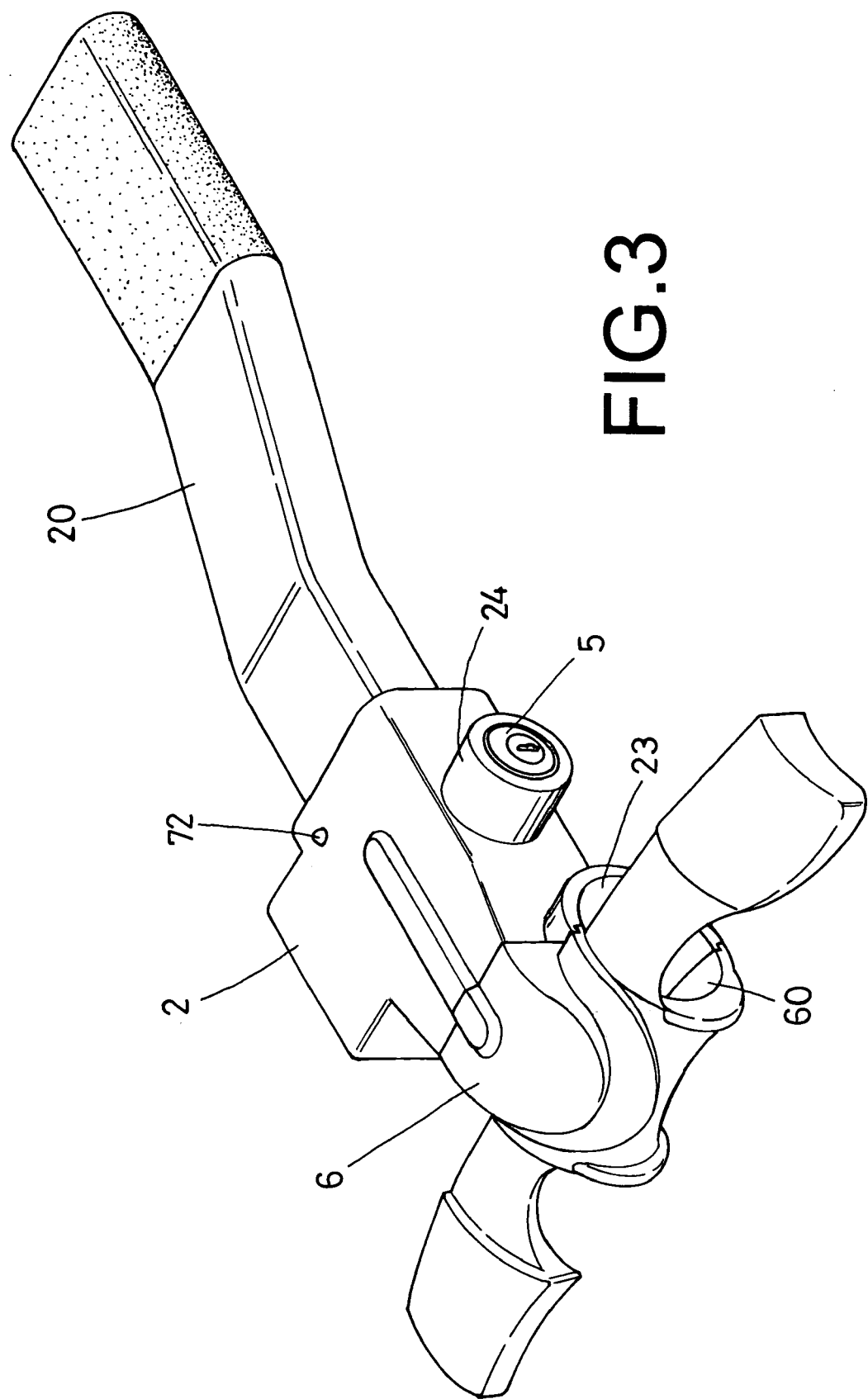
FIG. 3 is a perspective view of the automobile steering wheel lock in the present invention, showing it in the assembled condition.
Figure 4:
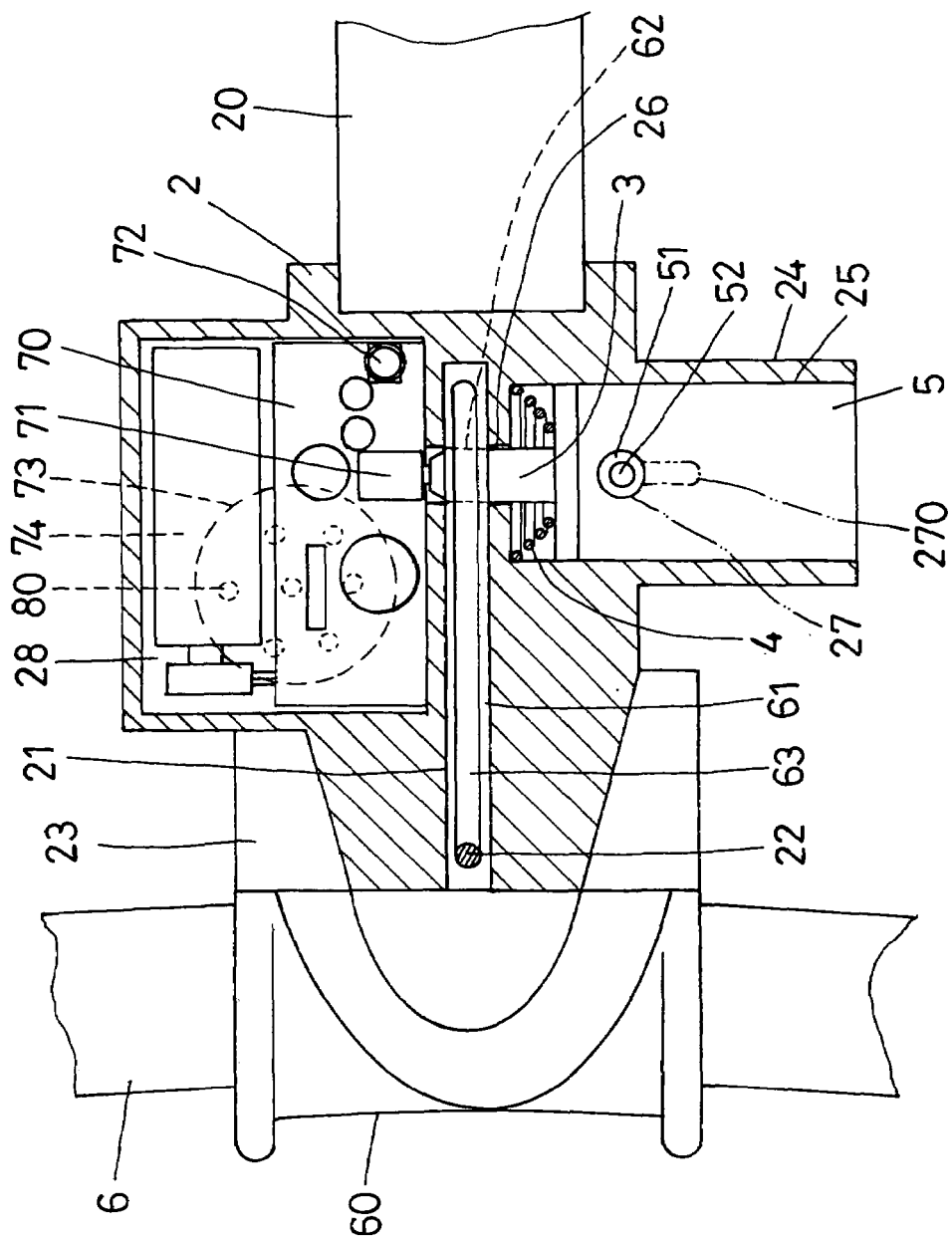
FIG. 4 is a cross-sectional view of the automobile steering wheel lock in the present invention, showing it in the locked condition.

A preferred embodiment of an automobile steering wheel lock in the present invention, as shown in FIGS. 2, 3 and 4, includes a stationary base 2, an insert pin 3, a helical spring 4, a locking core 5, a movable constrict base 6, an alarm unit 7, and a cover 8 as main components.

The stationary base 2 has a stop rod 20 formed in the rear portion, a slot 21 formed lengthwise in a front portion and having a stop pin 22 at a front end, a semi-circular fitting member 23 under a front end, a lock housing 24 formed to extend out on a side and having a lock chamber 25 with a hole 26 at its bottom for communicating with the slot 21, a fitting hole 27 in its inner wall with a slide groove 270 bored to connect with the fitting hole 27, and an alarm chamber 28 at the lower portion of the other side and a light hole 280 at its top communicating with the alarm chamber 28.

The insert pin 3 is T-shaped, located in the lock chamber 25 fitted around by the helical spring 4 and contacting the locking core 5 to move together.

The helical spring 4 is placed to fit around the insert pin 3, and possible to be pushed to shrink by the locking core 5.

The locking core 5 is positioned also in the lock chamber 25, having a rotary member 50 formed in the center portion and a projecting member 51 formed on the outer surface of the locking core 5 and having a protruding point 52 in the center.

The movable constrict base 6 is located in front of the stationary base 2, having a semi-circular fitting member 60 under the front end to face to the semi-circular fitting member 23 of the stationary base 2, and an elongated telescoping rod 61 formed in the rear portion and having an insert hole 62 at an outer end and a slide groove 63 on an upper surface.

The alarm unit 7 is located in the alarm chamber 28, having a circuit board 70 that carries an on/off switch 71, a signal light 72, a buzzer 73 under the circuit board 70 and a battery 74 next to the circuit board 70.

The cover 8 closes on the bottom of the alarm chamber 28, having a plurality of sound holes 80 cut in it.

In assembling, with reference to FIGS. 2,3 and 4, the helical spring 4 is placed to fit around the insert pin 3, then the helical spring 4 together with the insert pin 3 are placed in the lock chamber 25. Successively, the locking core 5 is also inserted in the lock chamber 25 to contact the insert pin 3 and to let the projecting member 51 fit in the fitting hole 27 in the lock chamber 25. Next, the elongate telescoping rod 61 is fitted into the slot 21 with the stop pin 22 fitted in the slide groove 63 to enable the elongate telescoping rod 61 slide back and forth in the slot 21. Next, the alarm unit 7 is placed in the alarm chamber 28 wherein the circuit board 70 must be positioned correctly to keep said signal light 72 fitted in said light hole 280, with the switch 71 facing pivotally to the hole 26. Finally, the cover 8 is closed on the bottom of the alarm chamber 28 and let the buzzer 73 facing rightly to the sound holes 80. Thus, the whole assembly of the automobile steering wheel lock with an alarm unit is finished.

Figure 5:
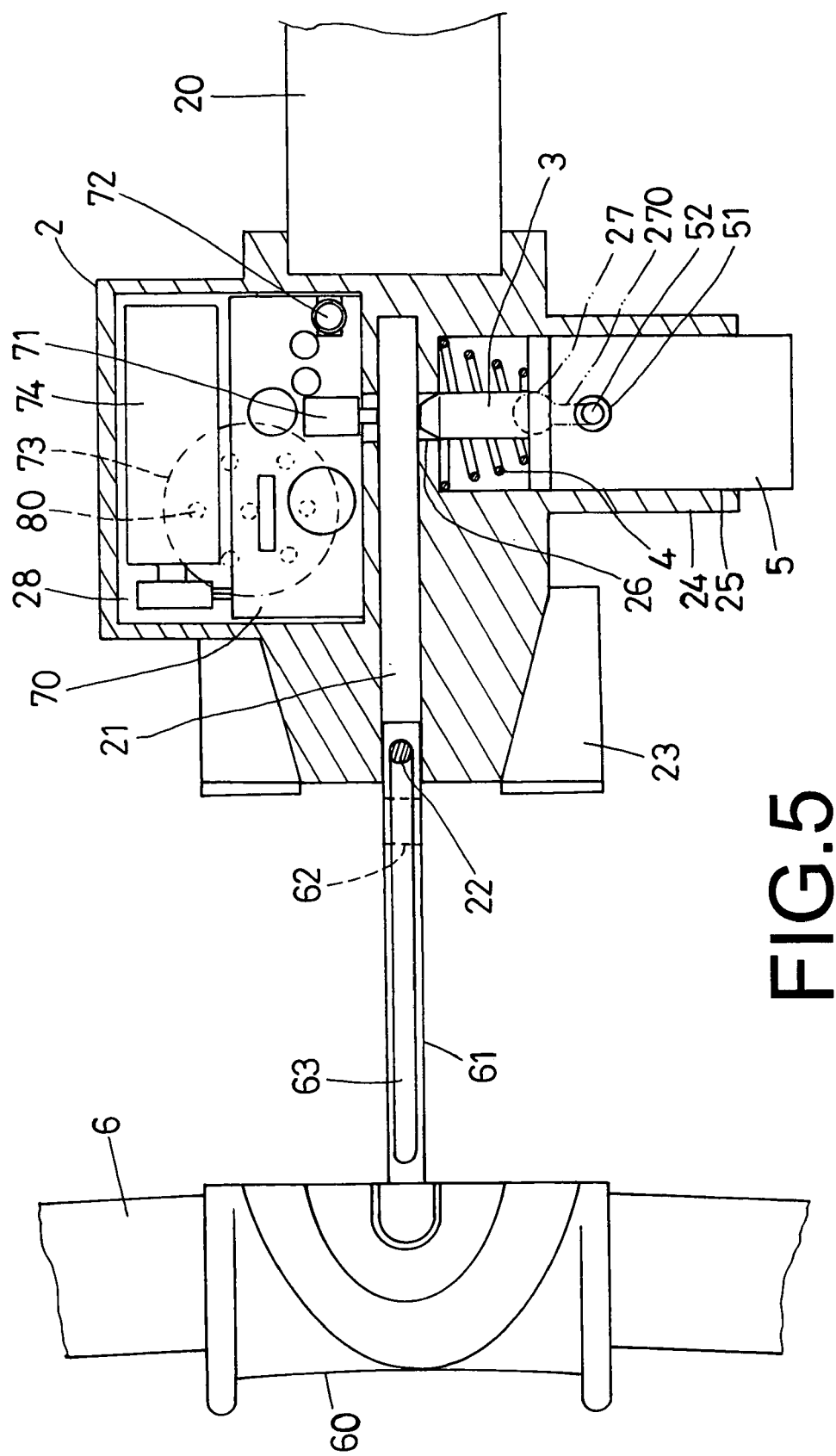
FIG. 5 is a cross-sectional view of the automobile steering wheel lock in the present invention, showing it in the unlocked condition; and, FIG. 6 is a perspective view of the automobile steering wheel lock in the present invention, showing it locked on the steering wheel of an automobile.
Figure 6:
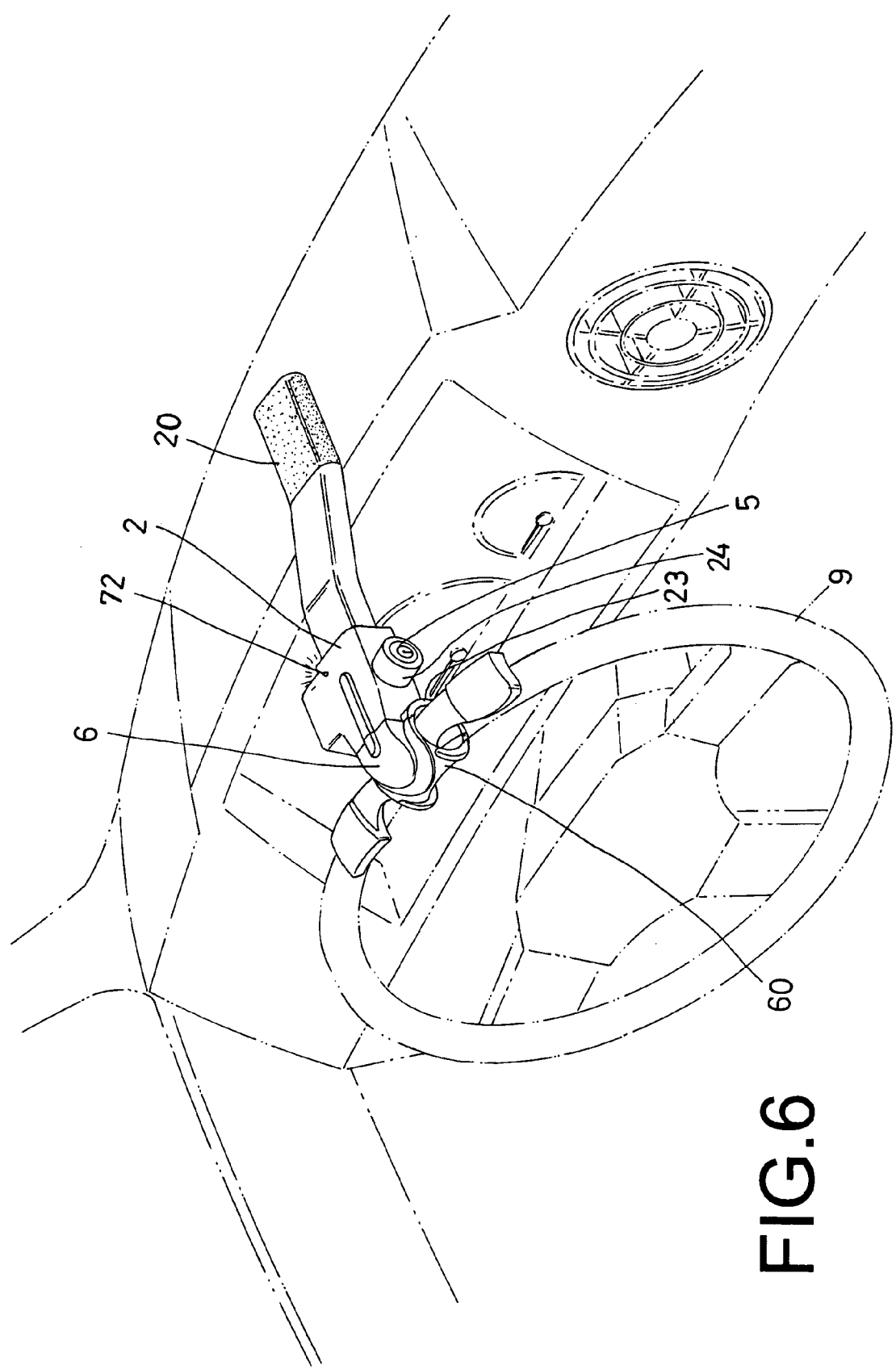

In using the steering wheel lock on the steering wheel of a car, with reference to FIGS. 5 and 6, a key is needed to rotate the rotary member 50. As the rotary key lock 50 is turned around, it will cause the projecting member 51 to move downwards and separate from the fitting, hole 27, enabling the helical spring 4, being out of compression, pushes both the insert pin 3 and the locking core 5 outwards. Then the protruding point 52 can only slide in the slide groove 270. And the move-back of the insert pin 3 will also make itself separated from the insert hole 62 so that the elongated telescoping rod 61 is able to extend outwards, without possibility of falling off the stationary base 2. Then the stop pin 22 is blocked at an outer end of the slide groove 63, keeping both the semicircular fitting members 60, 23 apart. Then, the lock is placed on a section of the steering wheel of a car, with the semicircular fitting member 23 fitted around the outer edge of the steering wheel, and adjust the grip 20 to evenly press on the top of the panel. Next, push the semicircular fitting member 60 of the movable constrict base 6 towards the semicircular fitting member 23 of the stationary base 2, that is, the elongate telescoping rod 61 is moved in the slot 21 inwards until the semicircular fitting member 60 smoothly fits around the inner edge of the steering wheel. Under this condition, both the semicircular fitting members 60 and 23 wrap up the steering wheel and the insert holes 62 and 26 face rightly each other. Then, the locking core 5 is pushed inwards into said lock chamber 25 until the protruding point 52 slides along said slide groove 270 and fits in the fitting holes 27 to complete locking. And, simultaneously, the helical spring 4 is compressed and the insert pin 3 has its end fitting naturally in the insert hole 62 to keep the elongated telescoping rod 61 positioned immobile and to press the switch 71 on for actuating the alarm unit 7, as shown in FIG. 4. The signal light 72 is to tell whether the alarm unit 7 is on or off. Such is the whole procedure of locking the steering wheel lock in the present invention on a car.

In case that the steering wheel lock is touched or opened by a wrong key by a thief, the buzzer 73 may be started to make a sound for alarming. The only way to stop the alarming sound is to unlock the lock by a correct key to keep the insert pin 3 from pressing on said switch 71 and from locking with the insert hole 62. Thus, this lock has a better effect for anti-theft.

While the preferred embodiment of the invention has been described above, it will be recognized and understood that various modifications may be made therein and the appended claims are intended to cover all such modifications that may fall within the spirit and scope of the invention.

What is claimed is:

1. An anti-theft lock for an automobile steering wheel comprising:
    a stationary base having a stop rod formed in a rear portion, a slot formed along a lengthwise direction of the stop rod in a front portion, a semi-circular fitting member formed under a front end, a locking housing extending out from a side and having a lock chamber in its hollow interior, said locking housing having an insert hole at an end and communicating with said slot, and an alarm chamber provided in a lower hollow interior of said stationary base;
    an insert pin of a T shape located in said lock chamber;
    a helical spring placed to fit around said insert pin;
    a locking core located in said lock chamber and having a rotary member in the center portion;
    a movable constrict base located in front of said stationary base and having a semi-circular fitting member to face to said semi-circular fitting member of said stationary base to enclose a portion of die steering wheel, and an elongate telescoping rod formed in a rear portion and bore with an insert hole in an outer end; said telescopic rod fittings into said slot and said insert pin extended into said insert hole to fix said telescopic rod in a locked position
    an alarm unit located in said alarm chamber; and,
    a cover closing up the bottom of said alarm chamber and having a plurality of sound holes in it.

2. The anti-theft lock as claimed in claim 1, wherein said slot of said stationary base has a stop pin at a front end, and said elongate telescoping rod has a slide groove on all upper surface for said stop pin to fit therein and slide back aid forth.

3. The anti-theft lock as claimed in claim 1, wherein said lock chamber of said lock housing has a fitting hole in its inner wall and a slide groove bored to connect with said fitting hole, and said locking core has a projecting member on its outer wall to face to said fitting hole of said stationary base and allowing it to move downwards for unlocking, and said projecting member has a protruding point in the center.

4. The anti-theft lock as claimed in claim 1, wherein said alarm unit has a circuit board which carries a switch, a signal light, a buzzer under said circuit board and a battery besides said circuit board, and a light hole is bored in the top of said stationary base to communicate with said alarm chamber for said signal light to lit therein.

* * * * *